US009014255B2

(12) United States Patent
Schweid et al.

(10) Patent No.: US 9,014,255 B2
(45) Date of Patent: Apr. 21, 2015

(54) SYSTEM AND METHOD FOR IDENTIFYING UNIQUE PORTIONS OF VIDEOS WITH VALIDATION AND PREDICTIVE SCENE CHANGES

(75) Inventors: Stuart Schweid, Pittsford, NY (US); Raja Bala, Pittsford, NY (US); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 616 days.

(21) Appl. No.: 13/438,277

(22) Filed: Apr. 3, 2012

(65) Prior Publication Data

US 2013/0259123 A1 Oct. 3, 2013

(51) Int. Cl.

*H04B 1/66* (2006.01)
*H04N 21/234* (2011.01)
*H04N 21/845* (2011.01)
*H04N 21/8541* (2011.01)

(52) U.S. Cl.

CPC ... *H04N 21/23412* (2013.01); *H04N 21/23418* (2013.01); *H04N 21/8455* (2013.01); *H04N 21/8541* (2013.01)

(58) Field of Classification Search

CPC .................. H04N 21/23412; H04N 21/23418; H04N 21/8455; H04N 21/8541

See application file for complete search history.

(56) References Cited

U.S. PATENT DOCUMENTS 6,104,441 A * 8/2000 Wee et al. ................ 375/240.15
6,393,054 B1 * 5/2002 Altunbasak et al. .......... 375/240
2002/0021756 A1 * 2/2002 Jayant et al. ............. 375/240.16
2002/0196850 A1 * 12/2002 Liu et al. .................. 375/240.12
2003/0202706 A1 * 10/2003 Uchibayashi et al. ........ 382/236
2005/0289583 A1 * 12/2005 Chiu .............................. 725/22
2006/0020961 A1 * 1/2006 Chiu .............................. 725/32
2007/0041448 A1 * 2/2007 Miller et al. ............. 375/240.18
2007/0201832 A1 * 8/2007 Date et al. ....................... 386/95
2008/0152323 A1 * 6/2008 Hora ............................ 386/126
2008/0232468 A1 * 9/2008 Kwon et al. ............. 375/240.12
2010/0067880 A1 * 3/2010 Ikeda ............................ 386/109
2010/0238354 A1 * 9/2010 Shmueli et al. ............... 348/607
2010/0303366 A1 * 12/2010 Zhang ........................... 382/218
2011/0081131 A1 * 4/2011 Hattori .......................... 386/328
2011/0311152 A1 * 12/2011 Takahashi et al. ............ 382/236
2013/0016770 A1 * 1/2013 Kishigami et al. ....... 375/240.02

* cited by examiner

*Primary Examiner* — Sath V Perungavoor
*Assistant Examiner* — Peter D Le
(74) *Attorney, Agent, or Firm* — Simpson & Simpson, PLLC

(57) ABSTRACT

A computer-based method for generating a compressed data stream, including using a specially programmed computer to: access a first compressed data stream including a first plurality of sequentially arranged frames including respective compressed frame data; access a second compressed data stream including a second plurality of sequentially arranged frames including respective compressed frame data; compare respective compressed data for sequentially matched pairs of frames in the first and second pluralities of frames; select, based on the comparison, common and unique portions in the first data stream; and select, based on the comparison, first and second portions in the second data stream, matched with the common and unique portions, respectively, in the sequence. The first portion has respective compressed frame data equal to the respective compressed frame data for the common portion. The second portion has respective compressed frame data unequal to the respective compressed frame data for the common portion.

32 Claims, 6 Drawing Sheets

SYSTEM AND METHOD FOR IDENTIFYING UNIQUE PORTIONS OF VIDEOS WITH VALIDATION AND PREDICTIVE SCENE CHANGES

TECHNICAL FIELD

The presently disclosed embodiments are directed to a system and method for identifying unique and common portions of videos, using compressed data, and creating personalized videos by using common portions in a template video and rendering and compressing only unique portions for insertion in the template video.

BACKGROUND

Personalization or customization of videos is a growing field as video processing becomes less inexpensive and more ubiquitous. Known software can perform large scale customization of videos by modifying a template video with personalizing information found in a database; however, the process is very time consuming. For example, data for a video is typically in a compressed format, and the software requires that every database entry be rendered, that is, converted from compressed to decompressed format. It is known to only render the unique parts of movie and then create a composite video using a playlist of the common and unique parts. However, this is not an automated process and requires significant input from a user of the software. For example, the determination of unique parts is provided manually in Adobe After Effects by the user/programmer. The reliance on user input is very time consuming and is prone to both user data entry error as well as accuracy errors, for example, the user must estimate unique areas and as a result can easily overestimate or underestimate unique areas. These estimate errors can result in the loss of portions of the unique areas, or can result in needless operations on areas that are actually common.

It is known to identify scene changes in a single video through complex operations on compressed data for the video, for example, analysis of the data in the coefficient space.

SUMMARY

According to aspects illustrated herein, there is provided a computer-based method for generating a compressed template data stream, including using at least one specially programmed computer to access a first compressed data stream for a first movie, the first compressed data stream including a first plurality of frames arranged in a sequence, each frame in the first plurality including respective compressed frame data; access a second compressed data stream for a second movie, the second compressed data stream including a second plurality of frames arranged in a sequence, each frame in the second plurality including respective compressed frame data; compare respective compressed frame data for respective pairs of frames in the first and second pluralities of frames, matched according to the sequence; select, based on the comparison, a common portion and a unique portion in the first compressed data stream; and select, based on the comparison, first and second portions in the second compressed data stream, matched with the common and unique portions, respectively, in the sequence. The first portion has respective compressed frame data equal to the respective compressed frame data for the common portion. The second portion has respective compressed frame data unequal to the respective compressed frame data for the common portion.

According to other aspects illustrated herein, there is provided a computer-based method for generating a video, including using at least one specially programmed computer to: access a compressed data stream, for a first video, the compressed data stream including: a first plurality of frames arranged in a sequence, each frame in the first plurality of frames including respective compressed frame data; and in the first plurality of frames: a start validation intra-frame, and an end validation intra-frame following the start validation intra-frame in the sequence. The method includes using the at least one specially programmed computer to: access an unrendered data stream; identify first and second portions in the unrendered data stream matched with the start validation frame and the end validation frame, respectively, in the sequence; render and compress the first and second portions such that the first and second portions are first and second intra-frames, respectively; and compare respective compressed frame data for the start validation intra-frame and the first intra-frame, respectively. When respective compressed frame data for the start validation intra-frame and the first intra-frame are equal, compare respective pairs of bits, matched according to the sequence, in respective bit streams for the start validation frame and the first intra-frame. When respective compressed frame data for the start validation intra-frame and the first intra-frame are unequal: select a third intra-frame, from the first compressed data stream, preceding the start validation frame in the sequence as an adjusted start validation frame; select a third portion, in the unrendered data stream, matched with the adjusted start validation frame in the sequence; render and compress the third portion as a fourth intra-frame; and compare the respective compressed frame data for the adjusted start validation frame and the fourth intra-frame. The method includes using the at least one specially programmed computer to: compare respective compressed frame data for the end validation intra-frame and the second intra-frame, respectively. When respective compressed frame data for the end validation intra-frame and the second intra-frame are equal, compare respective pairs of bits, matched according to the sequence, in respective bit streams for the end validation frame and the second intra-frame. When respective compressed frame data for the end validation intra-frame and the second intra-frame are unequal: select a third intra-frame, from the first compressed data stream, following the end validation frame in the sequence as an adjusted end validation frame; select a third portion, in the unrendered data stream, matched with the adjusted end validation frame in the sequence; render and compress the third portion as a fourth intra-frame; and compare the respective compressed frame data for the adjusted end validation frame and the fourth intra-frame.

According to aspects illustrated herein, there is provided a computer-based system for generating a compressed template data stream, including: a memory element for at least one specially programmed computer arranged to store computer executable instructions; and at least one processor for the at least one specially programmed computer. The at least one specially programmed computer is arranged to execute the computer executable instructions to: access a first compressed data stream for a first movie, the first compressed data stream including a first plurality of frames arranged in a sequence, each frame in the first plurality including respective compressed frame data; access a second compressed data stream for a second movie, the second compressed data stream including a second plurality of frames arranged in a sequence, each frame in the second plurality including respective compressed frame data; compare respective compressed frame data for respective pairs of frames in the first and second pluralities of frames, matched according to the sequence; select, based on the comparison, a common portion and a unique portion in the first compressed data stream; and select, based on the comparison, first and second portions in the second compressed data stream, matched with the common and unique portions, respectively, in the sequence. The first portion has respective compressed frame data equal to the respective compressed frame data for the common portion; and the second portion has respective compressed frame data unequal to the respective compressed frame data for the common portion.

According to aspects illustrated herein, there is provided a computer-based system for generating a video, including: a memory element for at least one specially programmed computer arranged to store computer executable instructions; and at least one processor for the at least one specially programmed computer. The at least one processor is arranged to execute the computer executable instructions to: access a compressed data stream, for a first video, the compressed data stream including: a first plurality of frames arranged in a sequence, each frame in the first plurality of frames including respective compressed frame data; and in the first plurality of frames: a start validation intra-frame, and an end validation intra-frame following the start validation intra-frame in the sequence. The at least one processor is arranged to execute the computer executable instructions to: access an unrendered data stream; identify first and second portions in the unrendered data stream matched with the start validation frame and the end validation frame, respectively, in the sequence; render and compress the first and second portions such that the first and second portions are first and second intra-frames, respectively; compare respective compressed frame data for the start validation intra-frame and the first intra-frame, respectively. When respective compressed frame data for the start validation intra-frame and the first intra-frame are equal, compare respective pairs of bits, matched according to the sequence, in respective bit streams for the start validation frame and the first intra-frame. When respective compressed frame data for the start validation intra-frame and the first intra-frame are unequal: select a third intra-frame, from the first compressed data stream, preceding the start validation frame in the sequence as an adjusted start validation frame; select a third portion, in the unrendered data stream, matched with the adjusted start validation frame in the sequence; render and compress the third portion as a fourth intra-frame; and compare the respective compressed frame data for the adjusted start validation frame and the fourth intra-frame. The at least one processor is arranged to execute the computer executable instructions to: compare respective compressed frame data for the end validation intra-frame and the second intra-frame, respectively. When respective compressed frame data for the end validation intra-frame and the second intra-frame are equal, compare respective pairs of bits, matched according to the sequence, in respective bit streams for the end validation frame and the second intra-frame. When respective compressed frame data for the end validation intra-frame and the second intra-frame are unequal: select a third intra-frame, from the first compressed data stream, following the end validation frame in the sequence as an adjusted end validation frame; select a third portion, in the unrendered data stream, matched with the adjusted end validation frame in the sequence; render and compress the third portion as a fourth intra-frame; and compare the respective compressed frame data for the adjusted end validation frame and the fourth intra-frame.

According to other aspects illustrated herein, there is provided a computer-based method for generating a video, including using at least one specially programmed computer to: access a compressed data stream, for a first video, the compressed data stream including: a first plurality of frames arranged in a sequence, each frame in the first plurality of frames including respective compressed frame data; and in the first plurality of frames: a start validation intra-frame, and an end validation intra-frame following the start validation intra-frame in the sequence. The at least one specially programmed computer is arranged to: render the start and end validation frames such that the start and validation frames include first and second rendered frame data, respectively; access an unrendered data stream; identify first and second portions in the unrendered data stream matched with the start validation frame and the end validation frame, respectively, in the sequence; render the first and second portions such that the first and second portions include third and fourth rendered frame data, respectively; and compare the first and third rendered frame data. When the first and third rendered data are no more different than a threshold: render and compress a third portion of the unrendered data stream immediately following the first portion in the sequence; and insert the third portion into the first compressed data stream such that the third portion immediately follows the start validation frame. When the first and third rendered data are more different than a threshold: select an intra-frame, from the first compressed data stream, preceding the validation frame in the sequence as an adjusted start validation frame; select a third portion, in the unrendered data stream, matched with the adjusted start validation frame in the sequence; render the intra-frame and the third portion to include respective rendered frame data; and compare a difference between the respective rendered frame data to the threshold. The at least one specially programmed computer is arranged to: compare the second and fourth rendered frame data; and when the second and fourth rendered data are no more different than a threshold: render and compress a third portion of the unrendered data stream immediately preceding the second portion in the sequence; and insert the third portion into the first compressed data stream such that the third portion immediately precedes the end validation frame. When the second and fourth rendered data are more different than a threshold: select an intra-frame, from the first compressed data stream, following the validation frame in the sequence as an adjusted end validation frame; select a third portion, in the unrendered data stream, matched with the adjusted end validation frame in the sequence; render the intra-frame and the third portion to include respective rendered frame data; and compare a difference between the respective rendered frame data to the threshold.

According to aspects illustrated herein, there is provided a computer-based system for generating a video, including: a memory element for at least one specially programmed computer arranged to store computer executable instructions; and at least one processor for the at least one specially programmed computer. The at least one processor is arranged to execute the computer executable instructions to: access a compressed data stream, for a first video, the compressed data stream including: a first plurality of frames arranged in a sequence, each frame in the first plurality of frames including respective compressed frame data; and in the first plurality of frames: a start validation intra-frame, and an end validation intra-frame following the start validation intra-frame in the sequence. The at least one processor is arranged to execute the computer executable instructions to: render the start and end validation frames such that the start and validation frames include first and second rendered frame data, respectively; access an unrendered data stream; identify first and second portions in the unrendered data stream matched with the start validation frame and the end validation frame, respectively, in the sequence; render the first and second portions such that the first and second portions include third and fourth rendered frame data, respectively; and compare the first and third rendered frame data. When the first and third rendered data are no more different than a threshold: render and compress a third portion of the unrendered data stream immediately following the first portion in the sequence; and insert the third portion into the first compressed data stream such that the third portion immediately follows the start validation frame. When the first and third rendered data are more different than a threshold: select an intra-frame, from the first compressed data stream, preceding the validation frame in the sequence as an adjusted start validation frame; select a third portion, in the unrendered data stream, matched with the adjusted start validation frame in the sequence; render the intra-frame and the third portion to include respective rendered frame data; and compare a difference between the respective rendered frame data to the threshold. The at least one processor is arranged to execute the computer executable instructions to: compare the second and fourth rendered frame data. When the second and fourth rendered data are no more different than a threshold: render and compress a third portion of the unrendered data stream immediately preceding the second portion in the sequence; and insert the third portion into the first compressed data stream such that the third portion immediately precedes the end validation frame. When the second and fourth rendered data are more different than a threshold: select an intra-frame, from the first compressed data stream, following the validation frame in the sequence as an adjusted end validation frame; select a third portion, in the unrendered data stream, matched with the adjusted end validation frame in the sequence; render the intra-frame and the third portion to include respective rendered frame data; and compare a difference between the respective rendered frame data to the threshold.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

Figure 1:
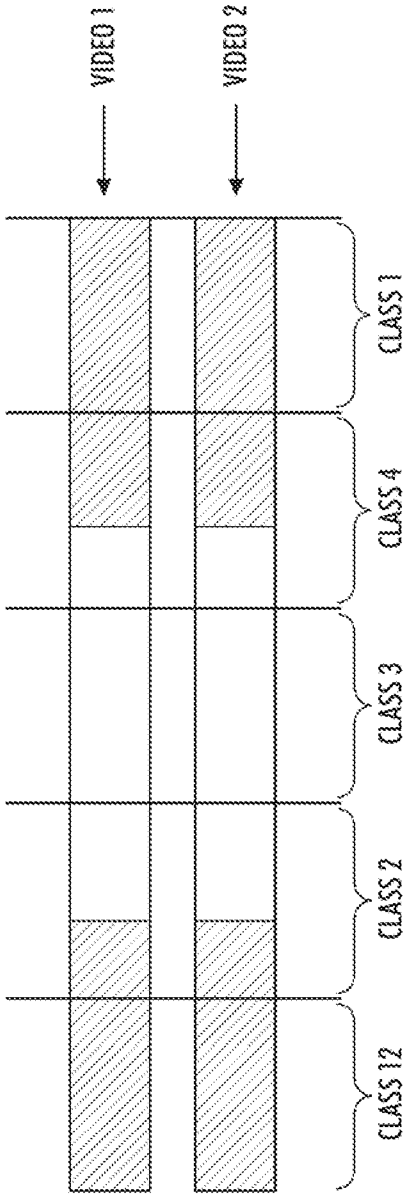
FIG. 1 is a block diagram showing classes of two compressed data streams.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

Unless defined otherwise, all technical and scientific terms used herein have the same meaning as commonly understood to one of ordinary skill in the art to which these to embodiments belong. The following definitions and considerations are applicable:

A. Scene file: Data produced, for example, by a video recording device, to represent a scene or scenes. A scene file contains objects in a strictly defined language or data structure; it would contain geometry, viewpoint, texture, lighting, and shading information as a description of the virtual scene.

B. Rendering: The process of using computer programs to generate an image based on an existing objects or models, for example, a scene file. A rendering program processes the data contained in a scene file to generate an output to a digital image or raster graphics image file. For example, the output is video data usable by a display device to reproduce the images in the scene file.

C. Rendering Engine: Software/firmware for rendering scene files.

D. Video data compression: A combination of spatial image compression and temporal motion compensation of rendered video data 1. Video compression typically operates on square-shaped groups of neighboring pixels, often called macroblocks. These pixel groups or blocks of pixels are compared from one frame to the next and, after adjusting for estimated motion, the video compression codec (encode/decode scheme) sends only the differences within those blocks. This works extremely well if the video has no motion. A still frame of text, for example, can be repeated with very little transmitted data. In areas of video with more motion, more pixels change from one frame to the next. When more pixels change, the video compression scheme must send more data to keep up with the larger number of pixels that are changing. Thus, compressed data for a frame including a scene change with respect a preceding frame typically is much larger than the compressed data for the preceding frame.

Video data contains spatial and temporal redundancy. Similarities can thus be encoded by merely registering differences within a frame (spatial), and/or between frames (temporal). With temporal compression only the changes from one frame to the next are encoded as often a large number of the pixels will be the same or be similar in a neighborhood on a series of frames.

2. Intra-frame versus interframe compression: Interframe compression uses one or more earlier or later frames in a sequence to compress the current frame, referred to as an "interframe." Intra-frame compression uses only the current frame, referred to as an "intra-frame" or "I frame," which is effectively image compression. The most commonly used method works by comparing each frame in the video with the previous one. If the frame contains areas where nothing has moved, the system simply issues a short command that copies that part of the previous frame, bit-for-bit, into the next one. If sections of the frame move in a simple manner, the compressor emits a (slightly longer) command that tells the decompresser to shift, rotate, lighten, or darken the copy: a longer command, but still much shorter than intra-frame compression.

One difference between intra-frame and interframe compression is that with intra-frame systems, each frame compressed data size is a function of the complexity of only that frame. In most interframe systems, certain frames (such as "I frames" or "intra-frames" in MPEG-2) aren't allowed to utilize data from other frames, and so require much more data than other frames nearby that can.

3. Applicable standards: The following is a list of standard applicable to video data compression. This list is not exhaustive: H.262/MPEG-2 Part 2; H.263; MPEG-4 Part 2; H.264/MPEG-4 AVC; and, VC-2 (Dirac).

E. Audio compression:

Audio data compression is designed to reduce the transmission bandwidth requirement of digital audio streams and the storage size of audio files. Audio compression algorithms are implemented in software as audio codecs. Lossless and lossy algorithms optimized for audio files have been created. In both lossy and lossless compression, information redundancy is reduced, using methods such as coding, pattern recognition and linear prediction to reduce the amount of information used to represent the uncompressed data.

F. Intra-frame coding: Intra-frame coding is used in video coding (compression). It is part of an intra-frame codec like prores or a group of pictures codec with interframes. The term intra-frame coding refers to the fact that the various compression techniques are performed relative to information that is contained only within the current frame, and not relative to any other frame in the video sequence. In other words, no temporal processing is performed outside of the current picture or frame.

G. Intra-frame data: Data included in an intra-frame and sufficient to reproduce the image and audio for a portion of a movie associated with the intra-frame and without reliance on or use of data from other frames.

Moreover, although any methods, devices or materials similar or equivalent to those described herein can be used in the practice or testing of these embodiments, some embodiments of methods, devices, and materials are now described.

The following is a summary overview of a method and system for generating a video. The present disclosure is direct to a method and system that automatically determine the unique and common parts of movies that will be produced by creating modified versions of a template movie using a database. The technique has several components described in detail infra. The components are: comparison of two instantiations of the movie using differing personalizing information, generation of common movie segments from the instantiated pair, determination of transition points within movie sequences and labeling of validation frames for validating subsequently generated unique instances of the movie.

The method and system start with two unique movies being generated using differing personalized information as input. Respective compressed data streams are generated from the movies and comparison of these movies is then done in the compressed domain. This has several major advantages. First, the method is not dependent on the presence of any codec. There is no need to know or understand the video/audio content or compression format. All that is needed is to know where the two movies are similar and where they differ. Secondly, comparison in the compressed domain is much faster. The compressed data length of a movie is much less than the full movie data length. As long as the movie and compression parameters of the two sample movies generated are identical (e.g. frame-rate, quality factor, motion estimation method) identical movie segments will, map to identical compressed data.

The comparison between movies is subdivided into comparison of video and audio. For two movie segments to be considered identical both their video and audio segments must be the same. If either the respective video or audio segments differ the two movie segments are considered to be unique. The comparison of video is further divided in comparisons of segments, or groups of pictures (GOPs). A GOP is an independently decodable section. A GOP does not require information from other frames to decompress. A GOP starts with an I-frame, independent frame, or intra-frame, that is, a self contained description of the first frame. It is followed by other frames (P or B frames) that use motion estimation and interframe data in the compression.

The file format for the compressed data streams, for example, H.264/MPEG-4 AVC, contains structural information that describes where the data for each GOP and audio compressed segments reside in the file. Using this structural information, temporally corresponding segments of two movies, that is two movies matched in sequence, which do not necessarily reside in similar locations in their respective files are compared. The comparison is done using a memory compare. As long as the data compares the two movies are identical. Once the data no longer is identical (a common to unique transition) the point at which the data differs corresponds to a differing frame.

The converse, however, is not true. If two bit streams of two GOPs do not match after a given frame the reconstructed frames may or may not be identical. Although potential unique to common transition frames can be identified in the compressed domain, it is necessary to at least partially decompress the respective bit streams and compare the two frames. For example, as noted above, frames following an intra-frame in a segment consist of differences from the previous frame (the frame does not include all the data necessary to produce the image/audio for the frame). Also, in the compressed domain, all that is known is the quantity of the data (data length). A frame must be decompressed to determine actual data content. Therefore, even if the compressed frame data for the two frames noted above are equal (have the same quantity of data), the rendered data could still be different, hence the need to at least partially decompress data for a comparison.

FIG. 1 is a block diagram showing classes of two compressed data streams. The heavy vertical lines denote segment or GOP boundaries. The various classes in FIG. 1, where common segments are shown hatched, and unique segments are not hatched, are as follows:

Class 1: The two GOP bit streams (and thus movie segments) are identical. This class is known to be the result of identical movie segments;

Class 2: The two GOPs start with identical bit streams and then have one or more differing frames. This class is known to be identical for the beginning frames and assumed to be different for all frames after the first difference. At most one transition from common to unique or unique to common is assumed in each GOP (typically a 1-3 second interval); and, Class 3: The two GOPs have different intra-frames (first frame data streams). Techniques for analyzing this class are described infra. We assume that the two movie segments are different. Techniques for analyzing this class are described infra.

The above classes are further addressed below.

It can be assumed that a transition from unique to common segments will produce a scene change, and frames that are part of a scene change will not compress well. Namely the prediction of the frame given the previous frame will be poor, as the new scene frame is not a small variation of its predecessor frame. The result is that a large number of bits are needed to encode the scene change frame. If only one of the frames in respective GOPs in the two data streams requires significantly more bits than all the other frames in the respective GOPs and the frames in the two data streams have the same frame number in the two GOPs being compared, it is assumed the frame might be a scene change, and thus a transition from unique to common segments. Further detail regarding such “outliers” is provided below.

It is then determined if the scene change corresponds to a transition in the GOP from a unique segment to a common segment in the next GOP. If the start of the next GOP corresponds to a common video segment, for example, Class 1 or Class 2 in FIG. 1, then the candidate scene change is presumed to be a unique to common transition, Class 4 in FIG. 1, since it is the only know transition prior to a know common segment. Validation steps are described below regarding the above process.

Once common movie segments are determined, the generation of common movie segments can be accomplished with file manipulation. No computation is required. There is no need to re-render the common segments or to decompress the video and crop it. Sets and subsets of GOPs can be copied in the compressed form to a new file as a common video segment.

The methodology above allows a simple method to compare two movies without decompression and to mark, with high accuracy, common and unique segments. In order to assure that a personalization of a movie is created correctly, a set of validation reference frames (video and audio) are generated for every unique time segment in the two sample movies during the unique/common determination process, that is, the comparison of the two sample movies. The validation reference frames “sandwich” the unique movie segments. The start validation frame of a unique movie segment is the last common frame preceding the first unique frame and the end validation frame is the first common frame following the last unique frame.

For every subsequently generated movie, a pair of start and end validation test frames are created for every unique movie segment. These frames have a time stamp identical to the validation reference frames created during the unique/common segment determination. If a personalization movie is correct its validation test frames match the validation reference frames. If such a match occurs then it can be deduced that the unique part of the new movie created is not larger Than the unique parts of the first two instantiations. If the validation frames do not match then the unique time segment of the movie must be grown, since the new movie unique times are not a subset of the first two instantiations. The growing process can be done one GOP at a time. At this point new validation frames can be created using the new larger unique segment times for future validations.

Further detail regarding the method and system described above is provided infra.

Figure 2:
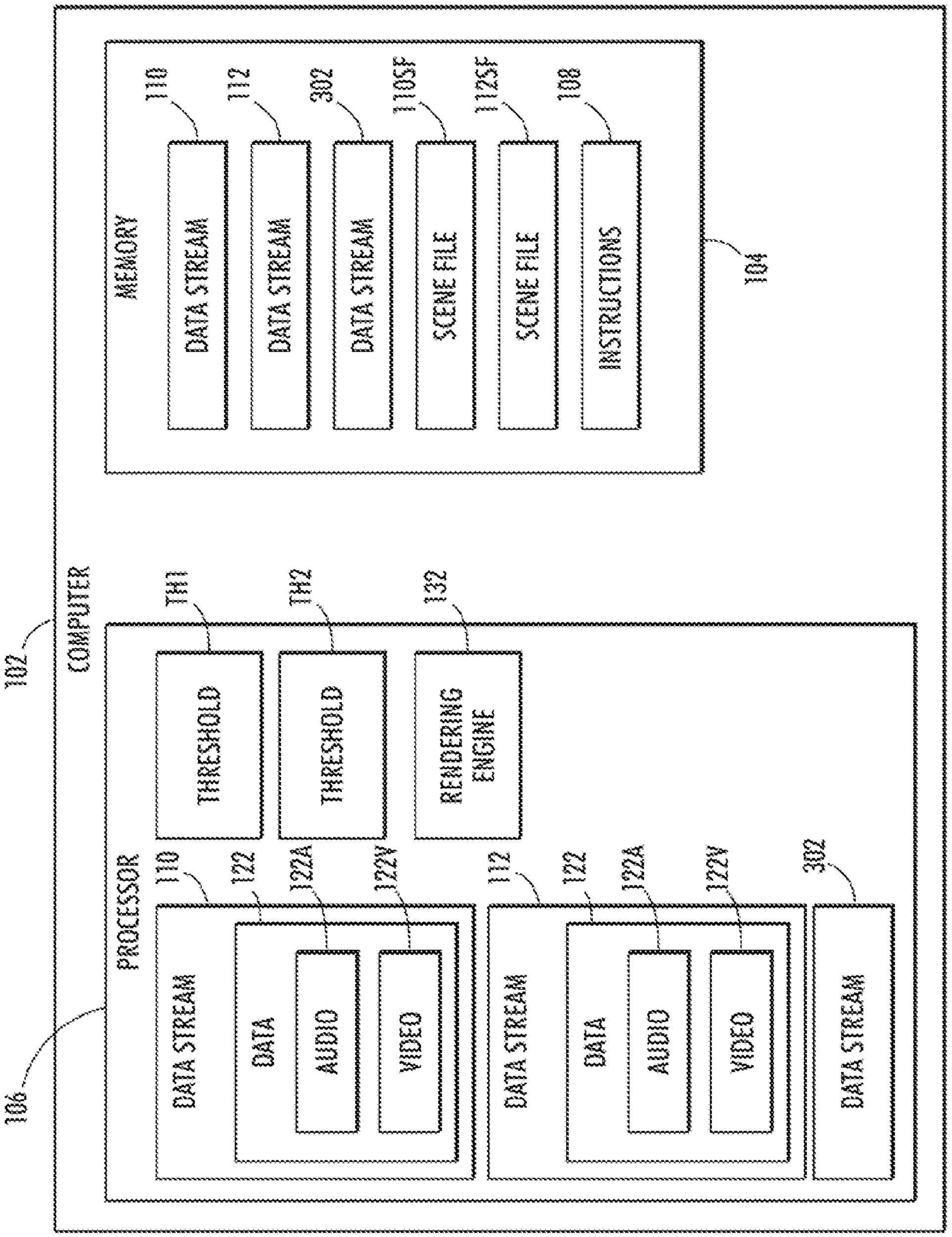
FIG. 2 is a block diagram of a computer-based system for identifying unique portions of videos with validation and predictive scene changes.

FIG. 2 is a block diagram of computer-based system 100 for identifying unique portions of videos with validation and predictive scene changes. System 100 includes at least one specially programmed computer 102 with at least one memory element 104 and at least one processor 106. The memory element is arranged to store computer executable instructions 108 and the processor is arranged to execute the computer-executable instructions. For the sake of brevity in the discussion that follows, it is understood that the phrases “the processor is arranged to” is synonymous with the phrase “the at least one processor is arranged to, or configured to, execute the computer executable instructions to.”

Figure 3:
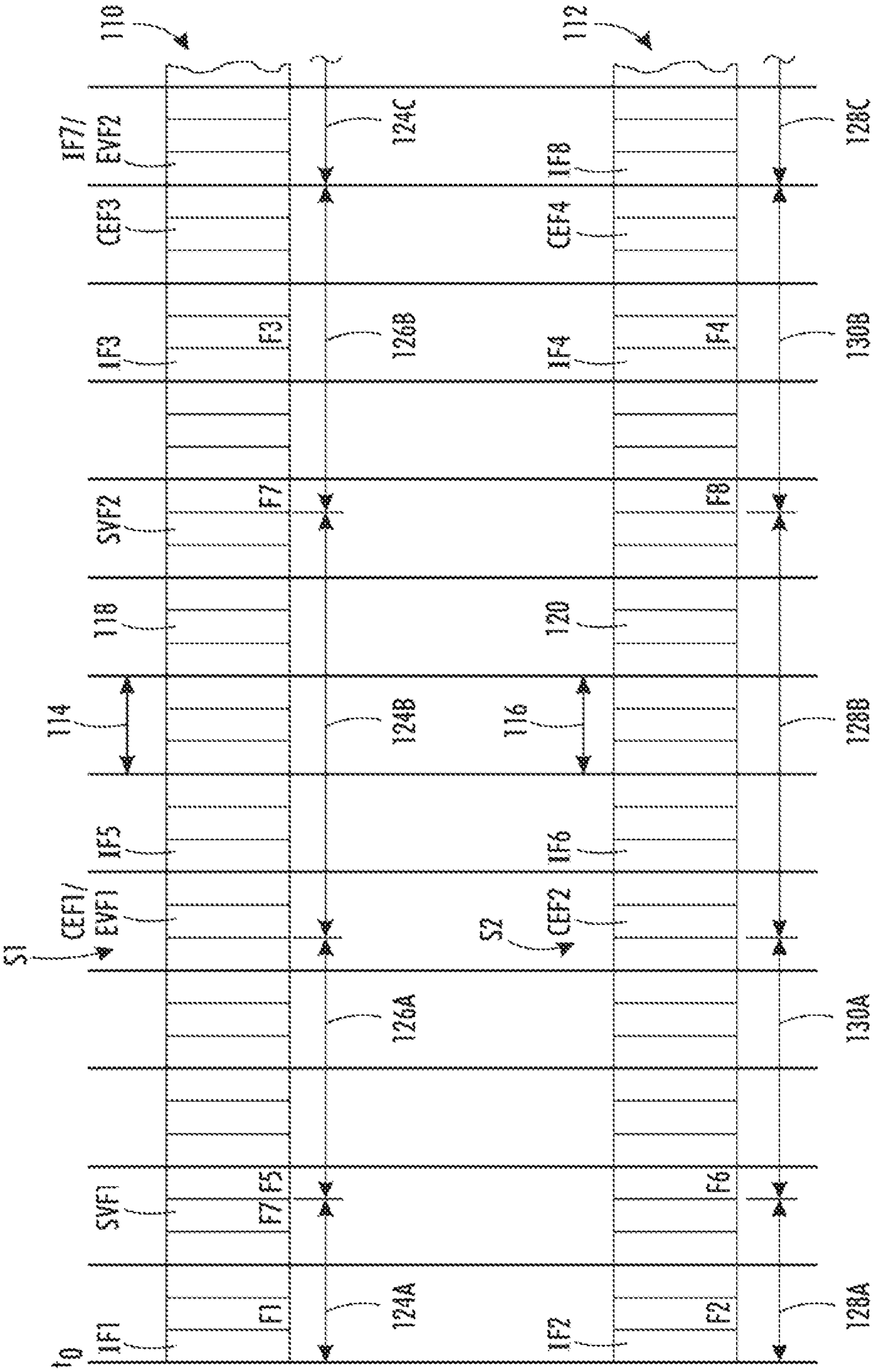
FIG. 3 is a diagrammatic illustration of two compressed data streams operated upon according to the system of FIG. 2.

FIG. 3 is a diagrammatic illustration of two compressed data streams operated upon according to the system of FIG. 2. The following should be viewed in light of FIGS. 1 through 3. The processor is arranged to access compressed data streams 110 and 112 for respective videos. In an example embodiment, the data steams are stored in the memory element. Data streams 110 and 112 include pluralities of segments, or groups of pictures, 114 and 116, respectively, arranged in a sequence. Each segment 114 includes a plurality of frames 118 arranged in sequence and each segment 116 includes a plurality of frames 120 arranged in sequence. By “arranged in a sequence” we mean that segments 114 and 116, and frames 118 and 120 are in a sequential, or temporal, order. Data streams 110 and 112 are not limited to any particular number of segments 114 or 116, respectively. Segments 114 and 116 are not limited to any particular number of frames 118 or 120, respectively. Each segment 114 and 116 has a same number of frames. Each frame 118 or 120 occupies a same span in the sequence. In the examples that follow, three frames are shown in each segment to simplify the presentation; however, it should be understood that the segments are not limited to having five frames only.

Each segment 114 or 116 includes an intra-frame located in an initial position, according to the sequence, in the segment, for example, IF1 and IF2. Positions of various segments and frames in data streams 110 and 112 can be correlated to each other according to the sequence. For example, using time $t_0$ as a common starting point for each of the data streams (in this case, to marks the first frame in the sequence of the data streams) frames F1 and F2 are matched “according to the sequence.” Hereinafter, “matched frames” means that the frames are in the same relative position in the sequence, for example, have the same time stamp.

Data streams 110 and 112 include respective compressed frame data 122 for each frame 118 or 120. That is, data 122 is the video and audio data necessary to replicate a portion of the respective movie associated with a particular frame. The processor is arranged to compare respective compressed frame data for respective pairs of frames in streams 110 and 112, matched according to the sequence, for example IF1 and IF2, or F1 and F2. Based on the comparison, the processor is further arranged to select at least one common portion 124, for example, 124A-124C, and at least one unique portion 126, for example, 126A-126B, in data stream 110. Data stream 112 includes portions 128, for example, 128A-128C, having respective data 122 equal to respective data 122 for the common portions. Thus, the portions of the videos in data streams 110 and 112 included in respective portions 124 and 128 are the same and are interchangeable. Data stream 112 includes portions 130, for example, 130A-130B, having respective data 122 unequal to respective data 122 for the unique portions. Thus, the videos for respective portions 126 and 130 are different and are not interchangeable. As further described below, the delineation of the common and unique portions enables insertion of unique portions from other videos without requiring changes to the common portions and with a minimal amount of rendering of the other videos.

It should be understood that unless stated otherwise, that by “equal data 122” we mean that the respective sizes, for example respective numbers of bits, of the data 122 are equal. However, two frames having equal data 122 in this context does not necessarily mean that the respective bit streams for the data 122 are identical. By identical we mean that when rendered, the two frames would reproduce the same images and audio. For example, two frames can have the same number of bit in respective data 122 but with at least some pairs of matched bits being different, which would result in different images and/or audio when rendered. It is understood that a certain amount of lossiness is typically inherent in a decompression process and “equality” for decompressed data takes this lossiness into account. That is, there is a tolerance or range for this equality. Thus, equal data 122 can result in unequal rendered data.

If two matched intra-frames have equal data 122, we assume the intra-frames have equal rendered data (common portion). If the two frames in question are interframes generated from respective intra-frames having equal data 122, we assume the rendered data for the two frames are equal (common portion). For example, in FIG. 3, data 122 for intra-frames IF1 and IF2 are equal and we assume that decompressed data for frames F1 and F2, interframes generated from IF1 and IF2, respectively, are equal.

If two matched intra-frames have unequal data 122, we assume the intra-frames have unequal rendered data (unique portion). If two matched frames are inter-frames generated from respective intra-frames having unequal data 122, we cannot make a determination regarding the frames without further analysis, which is described below. For example, data for intra-frames IF3 and IF4 are unequal and we are unable to evaluate the equality of the decompressed data for frames F3 and F4. For example, even if data 122 for F3 and F4 are equal, since data 122 for F3 and F4 are generated from respective intra-frames having unequal data 122; we cannot predict the status of the rendered data for F3 and F4.

In an example embodiment, data 122 includes video compressed data 122V and audio compressed data 122A. For portions 124 and 128, respective data 122V are equal and respective data 122A are equal. For portions 126 and 130, rendered data for respective data 122V are unequal and/or rendered data for respective data 122A are unequal.

In an example embodiment, a process of identifying common and unique portions of compressed data streams 110 and 112 begins with identifying respective starting points for unique portions. The processor is arranged to select a pair of intra-frames from the compressed data streams 110 and 112, respectively, matched according to the sequence and having equal respective compressed frame data. The matched pair is part of a common portion. In the example, of FIG. 3, the process begins at $t_0$. The processor is arranged to identify an initial occurrence of a pair of matched frames from compressed data streams 110 and 112, following the pair of intra-frames in the sequence and having unequal respective compressed frame data. By "initial occurrence" we mean the first time such a pair of frames is encountered in the sequence. For example, intra-frames IF1 an IF2 are pair of intra-frames in a common portion, and frames F5 and F6 are the first pair of frames encountered in the sequence with unequal data 122. This initial occurrence marks a transition from a common portion to a unique portion.

The processor is arranged to identify a frame in data stream 110, immediately preceding frame F5 in the sequence, for example, F7, as a start validation frame, in this case SVF1. Thus, a transition from common portion 124A to unique portion 126A occurs at SVF1. That is, SVF1 is the last frame in common portion 124A.

To identify the next common portion, the processor selects the next occurrence of matched intra-frames from compressed data streams 110 and 112 following the start validation frame in the sequence and having equal data 122. In the example of FIG. 3, the next such pair is IF5 and IF6. As described above, the processor is arranged to identify an initial occurrence of a pair of frames from compressed data streams 110 and 112 following IF5 and IF6 in the sequence, matched according to the sequence, and having unequal respective compressed frame data, for example, frames F7 and F8. As described above, the frame preceding F7 in the sequence is selected as SVF2 for unique portion 126B. It should be understood that a start validation frame can be an intra-frame or an interframe.

In an example embodiment, if the start validation frame is an interframe, the processor is arranged to operate on the start validation frame such that the start validation frame is an intra-frame. For example, the processor accesses scene file 110SF for compressed data stream 110, for example, stored in the memory element, and uses rendering engine 132 to generate rendered data for the start validation frame. The processor then compresses the rendered data to generate an intra-frame.

Advantageously, the selection of a start validation frame is accomplished automatically (no user input required) and using only compressed data 122. That is, there is no need to go through a time consuming process of decompressing and re-rendering data for the videos. Also, there is no need for manual input from a user of the system. For example, in FIG. 3, system 100 began analyzing frames at the beginning of compressed data streams 110 and 112, without input or guidance from the user, to identify start validation frames. As described below, the same automatic operation is used to define the end points of unique portions.

As further described below, start validation frames are used as reference points for using data stream 110 as a template into which unique portions of other videos can be substituted for unique portions in data stream 110.

An end point for a unique portion is defined by a unique to common transition. Unlike the detection of a common to unique transition, a simple comparison of the size of data 122 in data streams 110 and 112 cannot be used to verify a unique to common transition.

In an example embodiment, to identify a unique to common transition for a particular unique portion, the processor is arranged to identify an initial occurrence of matched intra-frames from data streams 110 and 112 following the start validation frame, for the particular unique portion, in the sequence having equal respective compressed frame data. By "initial occurrence" we mean the first time such a pair of frames is encountered in the sequence. For example, intra-frames IF5 an IF6 are the pair of intra-frames noted above following unique portion 126A.

An end validation frame is the first common frame following a unique portion. As noted above, data 122 for a particular frame consists of changes to data 122 in an immediately preceding frame. Thus, when a scene changes, which could indicate the start of a common portion (a unique to common transition), there is typically a great deal of data and compression is poor. That is, data 122 in the frame including the scene change is large. Thus, data 122 for the frame including a scene change is typically greater than preceding or following frames and is an outlier with respect to data 122 for those frames. To identify possible outliers and possible scene changes, the processor is arranged to compare respective compressed frame data for segments preceding the matched pair of intra-frames noted above, for example S1 and S2, to select respective candidate frames from the segments, for example, CEF1 and CEF2. CEF1 and CEF2 precede IF5 and IF6, respectively, in the sequence and are matched in position according to the sequence. Based on the comparison, the processor is arranged to determine if CEF1 and CEF2 have respective compressed frame data 122 different by more than a threshold, for example TH1, from remaining frames in S1 and S2, respectively. That is, the processor is arranged to determine if the data for the candidate frames are outliers with respect to the segments including the candidate frames.

In an example, embodiment, to determine if a segment has an outlier with respect to encoded bit length, two tests are employed: relative ratio of t-scores and a relative ratio of max values. The tests verify that only a single outlier of encoded bit exists using the following logic below:

1. Let $B_0$ be the set of encoded bit lengths of a segment, i.e. $B_0$={frame 0 bit length, frame 1 bit length, . . . )
   a. $M_0=\max(B_0)$, $k_{max}=\arg\max(B_0)$
2. Create the set $B_1=B_0\backslash M_0 \rightarrow B_1$ is the set of all encoded bit lengths except the largest one
   a. Set $M_1=\max(B_1)$, $m_1=E\{B_1\}$, $s_1^2=E\{(B_1-m_1)^2\}$, $t_1(M_0-m_1)/s_1$(t score)
3. Create the set $B_2=B_1\backslash M_1 \rightarrow B_2$ is the set of all encoded bit lengths except the largest 2
   a. Set $M_2=\max(B_2)$, $m_2=E\{B_2\}$, $s_2^2=E\{(B_2-m_2)^2\}$, $t_2=(M_1-m_2)/s_2$(t score)
4. Predict frame $k_{max}$ to a scene change frame if all of the following are true:
   a. $t_1>4$, $t_2<3$, $t_1/t_2>2$ (one and only value has a large t-score and its much larger than all others); and
   b. $M_0/M_1>2$, $M_1/M_2<1.5$ (the ratio of the $1^{st}$ to $2^{nd}$ largest encoded bit lengths is large and the ratio of $2^{nd}$ to $3^{rd}$ largest is small)

It is understood that the constants in step (4) above are initial estimates based up observed data and can be modified as more segments are analyzed.

In an example, embodiment, to determine if the candidate frames are end validation frames, the candidate frames are rendered and compressed as respective intra-frames and respective bit streams for the respective intra-frames are compared. For example, using scene file 110SF and scene file 112SF, the processor is arranged to render the candidate frames and then compress the rendered frames to generate respective intra-files. If the respective lengths of the bit streams for the candidate frames are equal and respective bits (matched in sequence) in the respective bit streams for the candidate frames are equal, the processor is arranged to designate the candidate frame in data stream 110, for example CEF1, respectfully, as an end validation frame for unique portion 126A, for example, EVF1.

When candidate frames are identified as outliers and rendered as intra-frames, but respective bit steams are not equal, for example, CEF3 and CEF4, the processor is arranged to select an intra-frame, following the candidate frame in data stream 110 as the end validation frame. For example, as noted above, to identify a unique to common transition for a particular unique portion, the processor is arranged to identify an initial occurrence of matched intra-frames from data streams 110 and 112 following the start validation frame, for the particular unique portion, in the sequence having equal respective compressed frame data. In the example of FIG. 3, for portion 126B, the matched intra-frames are IF7 and IF8, respective bit steams for CEF3 and CEF4 are not equal, and IF7 is then selected as the end validation frame for 126B.

In an example embodiment, a comparison of potential end validation frames is made using at least partially decompressed data. For example, outliers are identified as described above and selected as matched candidate frames, for example, if CEF1 and CEF2. The processor is arranged to at least partially decompress respective compressed frame data for the candidate frames and compare the at least partially decompressed data. For example, the processor is arranged to access scene files 110SF and 112SF to render CEF1 and CEF2. When the at least partially decompressed data are no more different than a second threshold, for example, TH2, the candidate frames are identified as unique to common transitions. The processor is arranged operate on the candidate frame in data stream 110 such that the candidate frame is an intra-frame. For example, as noted above, using scene file 110SF, the processor is arranged to render CEF1 and then compress the rendered frame to generate an intra-file. The intra-frame is selected as an end validation frame, for example, EVF1. As noted above, some lossiness is associated with decompression, and TH2 is used to account for such lossiness. TH2 is not limited to a particular value.

When the respective at least partially decompressed data are more different than a threshold, for example, TH2, the processor is arranged to select an intra-frame, following the candidate frame in data stream 110 as the end validation frame. For example, at least partially decompressed data for CEF3 and CEF4 fail the threshold test and IF7 is selected as EVF2.

It should be understood that if data streams 110 and 112 begin with unique portions, there are no start validation frames for these unique portions. Similarly, if data streams 110 and 112 end with unique portions, there are no end validation frames for these unique portions.

Figure 4:
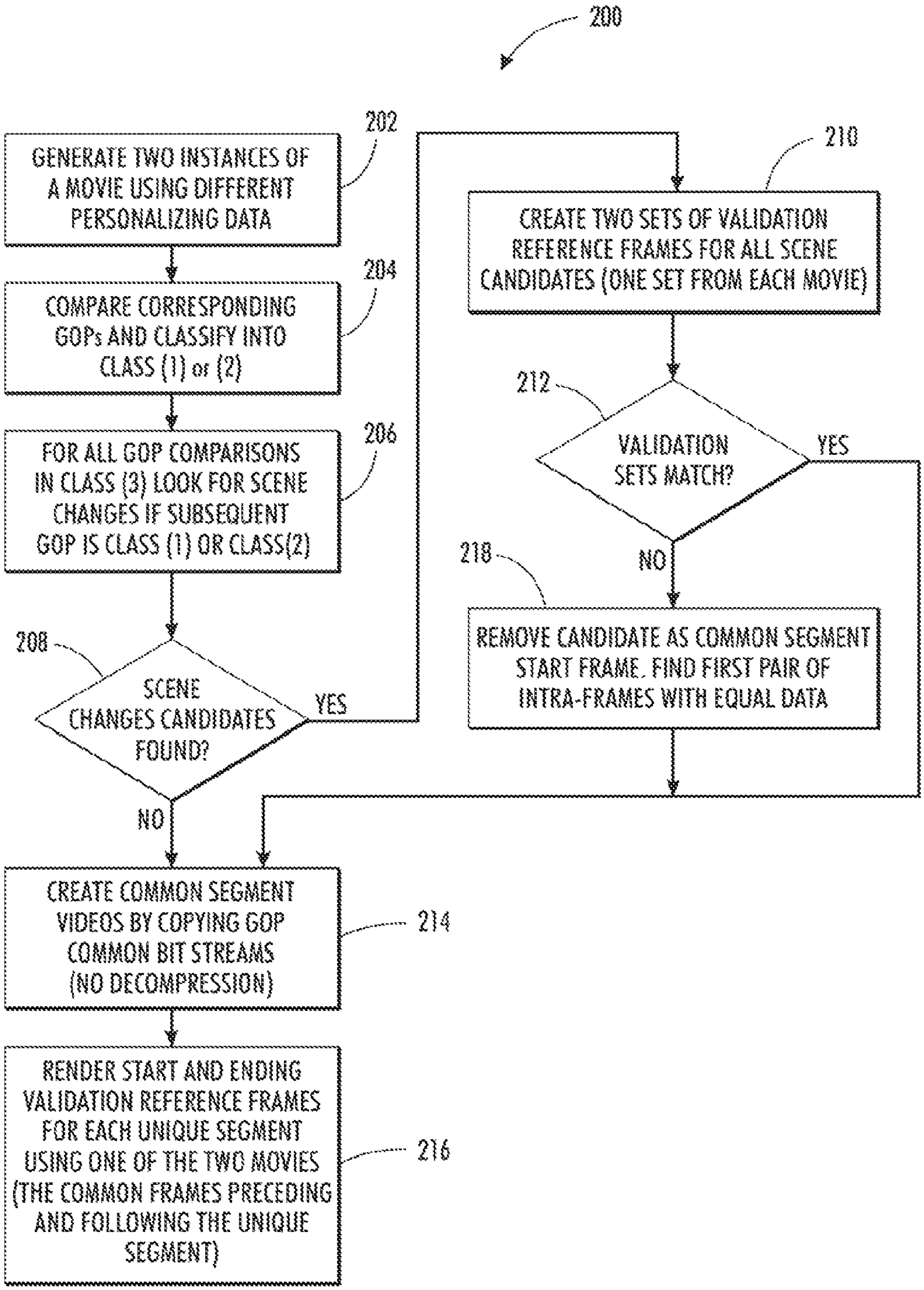
FIG. 4 is a flow chart illustrating a method of identifying unique portions of videos with validation and predictive scene changes; and, FIG. 5 is a diagrammatic illustration of the use of a template data stream; and, FIG. 6 is a flow chart illustrating a method of creating a new video.

FIG. 4 is flow chart 200 illustrating a method of identifying unique portions of videos with validation and predictive scene changes, for example, using system 100. In the discussion that follows, system 100 is used as an example of implementing the flow chart; however, it should be understood that flow chart 200 is not limited to use with system 100. In FIG. 4, step 202 generates compressed data streams 110 and 112. Steps 204, 206, 208, and 210 include the identification of candidate matched pairs of start validation frames and end validation frames in data streams 110 and 112 as described above. In step 212, the candidate start and end validation frames are analyzed to determine if the pairs meet the requirements noted above. For example, equal data 122 for start validation frames; and comparison of data for end validation frames using the outlier, and bit stream or decompression operations noted above. Once start and end validation frame sets (bracketing respective unique portions) are confirmed, common portions are created in step 214. As noted above, the creation of common portions advantageously is performed using compressed data. In step 216 start and end validation frames are rendered and compressed to form intra-frames. If candidate end validation pairs fail the test or tests of step 212, in step 218, the first matched intra-frames with equal data 122 are identified and the intra-frame from data stream 110 is selected as the end validation frame. For example, this process was described for EVF2 in FIG. 3. Once an end validation frame is selected in step 218, the method moves to step 214.

Figure 5:
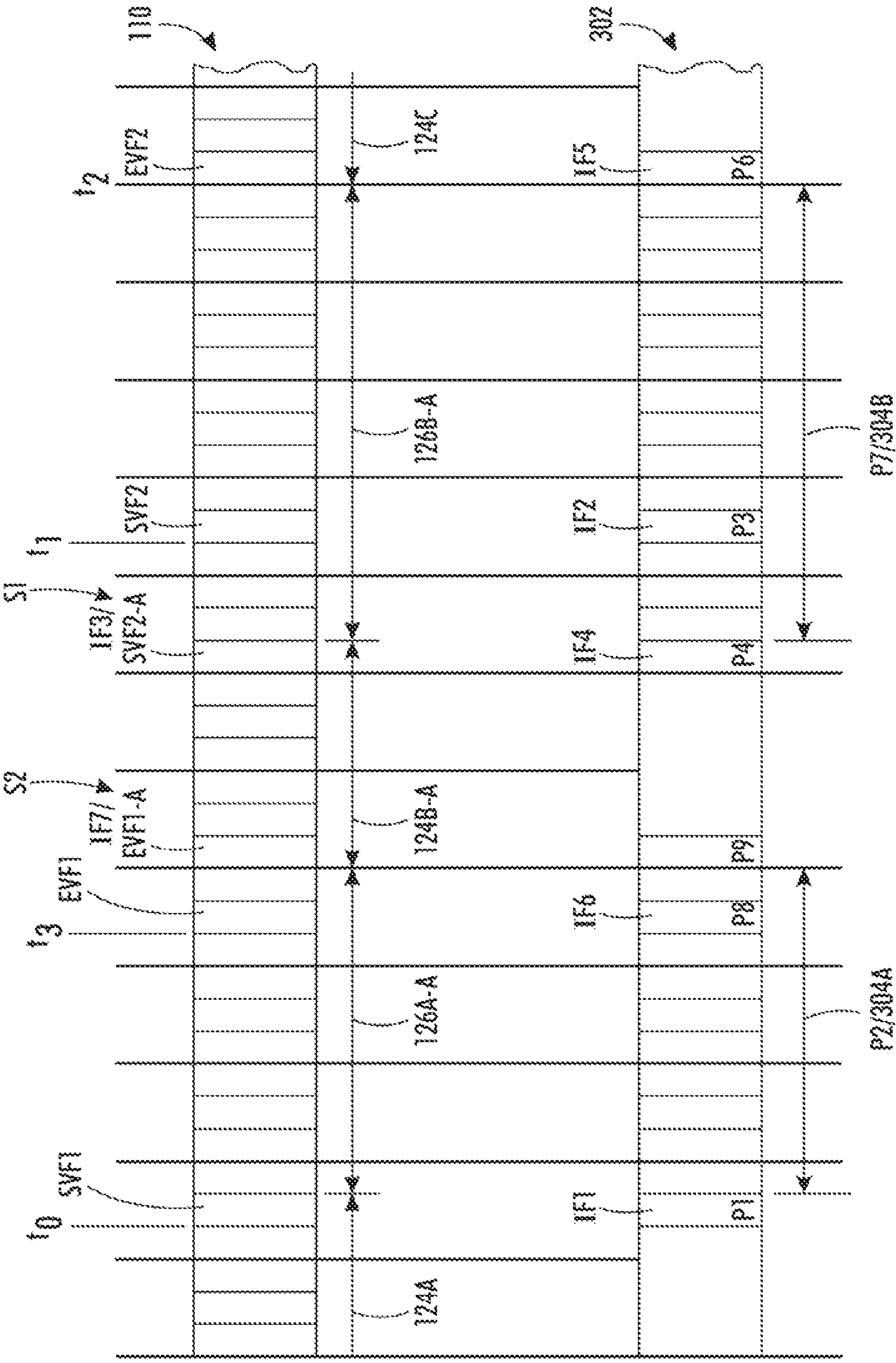

FIG. 5 is diagrammatic illustration of the use of a template data stream. The following should be viewed in light of FIGS. 1 through 5. Following the determination of common and unique portions, stream 110 becomes usable as a template data stream into which portions of other data streams are inserted. For example, portions of the other data streams matched with common segments in stream 110 do not need to be rendered (the common portion of data stream 110 is used) and only the unique portions of the other data streams need to be rendered and inserted into data stream 110.

In an example embodiment, the processor is arranged to access an uncompressed data stream, for example data stream 302, arranged in the sequence of data stream 110. In an example embodiment, data stream 302 is a, scene file. The processor is arranged to identify possible unique portions in data stream 302 that could be inserted into data stream 110 using start and end validation frames in data stream 110 as reference points.

The processor is arranged to select respective portions of data stream 302 matched, in the sequence, with respective start and end validation frames in data stream 110. The processor then is arranged to determine if the data for the respective portions of data stream 302 are sufficiently close to the data for start and end validation frames in data stream 110. That is, the processor determines if the respective portions represent transition points in data stream 302. If the end validation frames were selected using the bit stream analysis described above, the processor applies a bit stream analysis to the end validation frames and the portions of data stream 302 matched with the end validation frames. The same approach is used for the start validation frames and the portions of data stream 302 matched with the start validation frames. If the end validation frames were selected using the decompression and lossy comparison analysis described above, the processor applies the same type of analysis to the end validation frames and the portions of data stream 302 matched with the end validation frames.

The following is directed to the start validation frames. For example, SVF1 occurs at time $t_0$ and the processor selects portion P1 from stream 302. The processor is arranged to render and compress P1 such that P1 is an intra-frame (IF1) and compare the respective compressed frame data for SVF1 and IF1. In this case, the respective compressed frame data for SVF1 and IF1 are equal. As described above, the processor is arranged to compare respective pairs of bits, matched according to the sequence, in respective bit streams for SVF1 and IF1. If all respective pairs of bits are equal, which is the case in this example, the processor is arranged to render and compress a second portion of the unrendered data stream immediately following the first portion in the sequence, for example, P2/304A. The processor is arranged to insert the second portion into data stream 110 such that the second portion, for example, 304A, immediately follows the start validation frame in data stream 110, for example, SVF1.

If one or more respective pairs of bits for SVF1 and IF1 are not equal, the processor is arranged select an intra-frame, from data stream 110, preceding the start validation frame in the sequence as an adjusted start validation frame and repeats the comparison process described above. The process of adjusting the start validation frame is described in more detail below.

As another example, SVF2 occurs at time $t_1$ and the processor selects portion P3 from stream 302. The processor is arranged to render and compress P3 such that P3 is an intra-frame (IF2) and compare the respective compressed frame data for SVF2 and IF2. In this example, the respective compressed frame data for SVF2 and IF2 are not equal; or the respective compressed frame data for SVF2 and IF2 are equal, but SVF2 and IF2 failed the bit stream analysis described above. Then, the processor is arranged select an intra-frame, from data stream 110, preceding the start validation frame in the sequence as an adjusted start validation frame. For example, the processor is arranged to select IF3 from segment S1 preceding the segment including SVF2, as SVF2-A. The processor is arranged to select a portion from data stream 302, matched to SVF2-A according to the sequence, for example, P4.

The processor is arranged to render and compress P4 such that P4 is an intra-frame (IF4) and compare the respective compressed frame data for SVF2-A and IF4 and bit streams for SVF2 and IF2, as described above. When the respective compressed frame data for SVF2-A and IF4 are equal and SVF2 and IF2 pass the bit stream comparison, which is the case in this example, the processor is arranged to render and compress portion P5 immediately following P4 in the sequence, and insert P5 into data stream 110 such that P5 immediately follows SVF2-A. Thus, the processor is arranged to "grow" the unique portion of data stream 110. As a result, in data stream 110, portion 126B has been expanded to portion 126B-A and common portion 124B has been contracted to 124B-A.

If the respective compressed frame data or the respective bit streams for an adjusted start validation frame and the matching portion in data stream 302 are not equal, the processor is arranged to repeat the process described above by selecting the intra-frame preceding the adjusted start validation until an adjusted start validation frame and a matching portion in data stream 302 have equal respective compressed frame data and respective bit streams.

The following is directed to a bit stream comparison of end validation frames and matched portions of data stream 302. The processor is arranged to select respective portions of data stream 302 matched, in the sequence, with respective end validation frames in data stream 110. For example, EVF2 occurs at time $t_2$ and the processor selects portion P6 from stream 302. The processor is arranged to render and compress P6 such that P6 is an intra-frame (IF5) and compare the respective compressed frame data for EVF2 and IF5. In this case, the respective compressed frame data for EVF2 and IF5 are equal. As described above, the processor is arranged to compare respective pairs of bits, matched according to the sequence, in respective bit streams for EVF2 and IF5. If all respective pairs of bits are equal, which is the case in this example, the processor is arranged to render and compress a second portion of the unrendered data stream immediately preceding the first portion in the sequence, for example, P7/304B. The processor is arranged to insert the second portion into data stream 110 such that the second portion, for example, 304B, immediately precedes the end validation frame in data stream 110, for example, EVF2.

If one or more respective pairs of bits for EVF2 and IF5 are not equal, the processor is arranged select an intra-frame, from data stream 110, following the end validation frame in the sequence as an adjusted end validation frame and repeats the comparison process described above. The process of adjusting the end validation frame is described in more detail below.

As another example, EVF1 occurs at time $t_3$ and the processor selects portion P8 from stream 302. The processor is arranged to render and compress P8 such that P8 is an intra-frame (IF6) and compare the respective compressed frame data for EVF1 and IF6. In this example, the respective compressed frame data for EVF1 and IF6 are not equal; or the respective compressed frame data for EVF1 and IF6 are equal, but EVF1 and IF6 failed the bit stream analysis described above. Then, the processor is arranged select an intra-frame, from data stream 110, following the end validation frame in the sequence as an adjusted end validation frame. For example, the processor is arranged to select IF7 from segment S2 following the segment including EVF1, as EVF1-A. The processor is arranged to select a portion from data stream 302, matched to EVF1-A according to the sequence, for example, P9.

The processor is arranged to render and compress P9 such that P9 is an intra-frame (IF8) and compare the respective compressed frame data for EVF1-A and IF7 and bit streams for EVF1-A and IF7, as described above. When the respective compressed frame data for EVF1-A and IF7 are equal and EVF1-A and IF7 pass the bit stream comparison, which is the case in this example, the processor is arranged to render and compress portion P10 immediately following P9 in the sequence, and insert P10 into data stream 110 such that P10 immediately follows EVF1-A. Thus, the processor is arranged to "grow" the unique portion of data stream 110. As a result, in data stream 110, portion 126A has been expanded to portion 126A-A and common portion 124B has been contracted to 124B-A.

If the respective compressed frame data or respective bit streams for an adjusted end validation frame and the matching portion in data stream 302 are not equal, the processor is arranged to repeat the process described above by selecting the intra-frame following the adjusted end validation frame until an adjusted end validation frame and matching portion in data stream 302 have equal respective compressed frame data and respective bit streams.

The following is directed to a decompression and lossy comparison of end validation frames and matched portions of data stream 302. Using EVF2 as an example, the processor is arranged to at least partially decompress respective compressed frame data for EVF2 and P6 and compare the at least partially decompressed data. For example, the processor is arranged to access scene file 110SF and data stream 302 to render EVF2 and P6 such that the EVF2 and P6 include respective rendered frame data. The processor compares a difference between the respective rendered frame data for EVF2 and P6. When the rendered frame data are no more different than threshold, for example, TH2, which is the case in this example, the processor is arranged to render and compress a second portion of the unrendered data stream immediately preceding the first portion in the sequence, for example, P7/304B. The processor is arranged to insert the second portion into data stream 110 such that the second portion, for example, 304B, immediately precedes the end validation frame in data stream 110, for example, EVF2.

If the respective rendered frame data for an end validation frame and the matching portion in data stream 302 are more different than a threshold, the processor is arranged to repeat the process described above by selecting the intra-frame following the end validation frame as an adjusted end validation frame and repeating the rendered frame data comparison described above until an adjusted end validation frame and matching portion in data stream 302 are no more different than the threshold.

Figure 6:
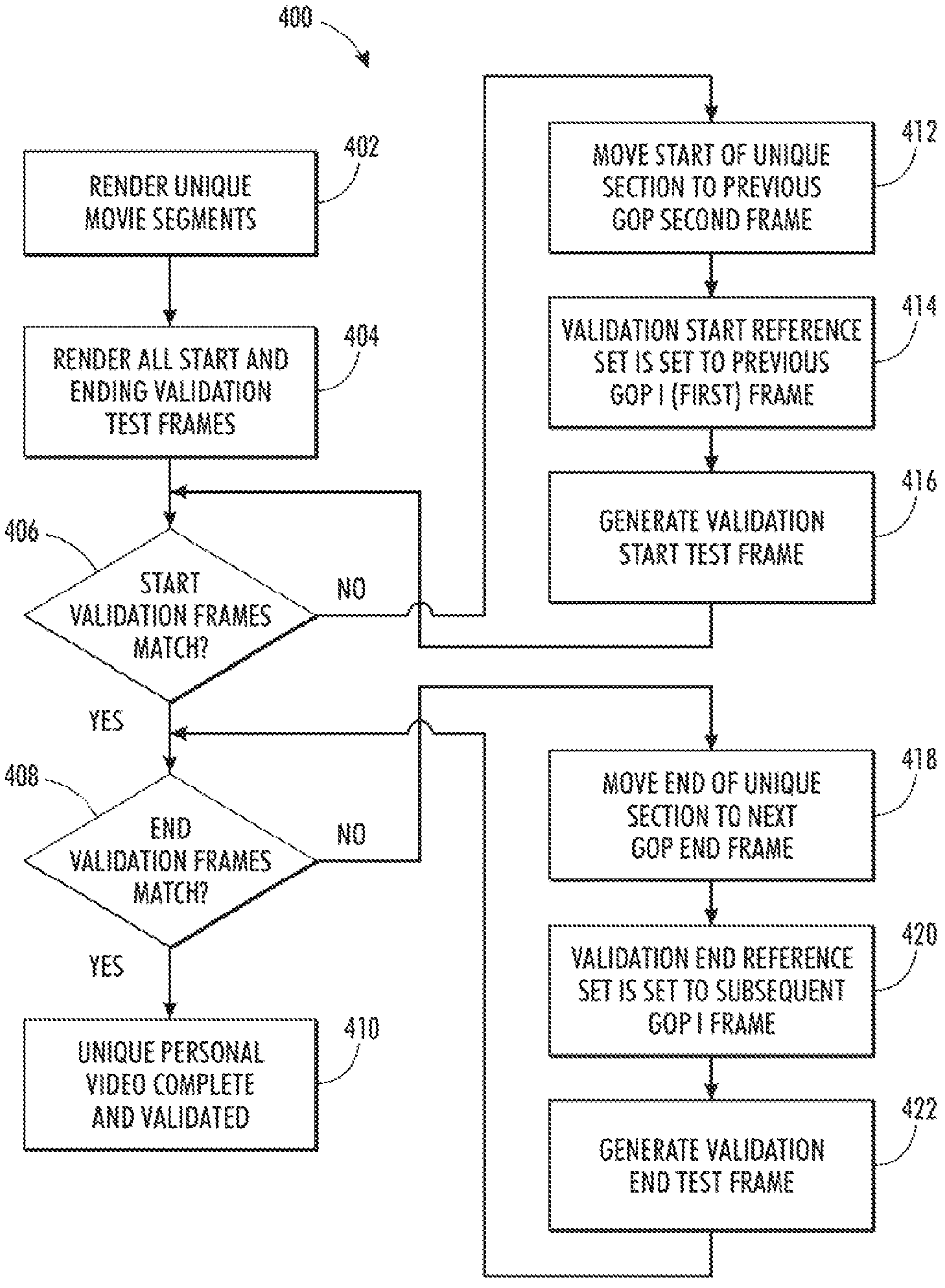

FIG. 6 is flow chart 400 illustrating a method of creating a new video. In the discussion that follows, system 100 is used as an example of implementing the flow chart; however, it should be understood that flow chart 400 is not limited to use with system 100. In FIG. 6, steps 402 and 404 result in the matching of start and end validation frames for a template data stream with matching intra-frames in an unrendered data stream, as described above. In step 406, respective compressed frame data for start validation frames and matching intra-frames in the unrendered data stream are compared. If the respective compressed frame data match, step 408 compares the respective compressed frame data for end validation frames and matching intra-frames in the unrendered data stream. If the respective compressed frame data match, the method proceeds to step 410 in which the unique portions of the unrendered data stream are rendered, compressed, and inserted into the unique portions of the template to create a new personalized data stream using the common portions of the template data stream.

If the start validation frame and the matching intra-frame fail at step 404, steps 412-416 implement the process of growing a unique portion and selecting an adjusted start validation frame as described above. Step 412 grows the unique portion as described above, step 414 selects the adjusted start validation frame for the expanded unique portion of the template data stream, and step 416 generates the matching infra-frame from the unrendered data stream. Step 406 compares the respective compressed frame data for the adjusted start validation frame and the matching inter-frame. If the intra-frames pass step 406, the process moves to step 408. If the intra-frames fail step 406, steps 412-416 are repeated as necessary.

If the end validation frame and the matching intra-frame fail at step 408, steps 418-422 implement the process of growing a unique portion and selecting an adjusted end validation frame as described above. Step 418 grows the unique portion as described above, step 420 selects the adjusted end validation frame for the expanded unique portion of the template data stream, and step 422 generates the matching infra-frame from the unrendered data stream. Step 408 compares the respective compressed frame data for the adjusted end validation frame and the matching inter-frame. If the intra-frames pass step 408, the process moves to step 410. If the intra-frames fail step 408, steps 418-422 are repeated as necessary.

The following describes an example application of the system and method of the present disclosure. A company provides a service in which a template video is modified to include personalized information. For example, the template video could be for a Professional Gold Association (PGA) tournament or for a celebration, such as a birthday party. To generate the template video, the company performs operations on two data streams, for example, as described for data streams 110 and 112, to generate common and unique portions. In the PGA example, the template video could show the gold course, various well-known players, and then show the leader board (a listing of players leading in the tournament) and a name of the player in the lead being erased. Up to this point, this would be a common portion of the template video.

In general, the template video is personalized, for example, unique portions are being added to the template video as described for data streams 110 and 302 above. In this example, the template video is being personalized for client John Golfer, such that after the name on the leader board is erased, the name of the client is shown being written on the leader board. The company populates the appropriate segments of a data stream, such as data stream 302, with the client's personal data and these segments form the unique portions to be added to the template video, for example, John Golfer's name being written on the leader board. Thus, only the unique portion of the personalized template video needs to be rendered, that is, the common portion of the template video does not need to be rendered. It should be understood that any number of additional unique portions could be added to the template video in this example.

It will be appreciated that various aspects of the above-disclosed embodiments and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer-based method for generating a compressed template Data stream, comprising using at least one specially programmed computer to:

access a first compressed data stream for a first movie, the first compressed data stream including a first plurality of frames arranged in a sequence, each frame in the first plurality including respective compressed frame data;

access a second compressed data stream for a second movie, the second compressed data stream including a second plurality of frames arranged in a sequence, each frame in the second plurality including respective compressed frame data;

compare respective compressed frame data for respective pairs of frames in the first and second pluralities of frames, matched according to the sequence;

select, based on the comparison, a common portion and a unique portion in the first compressed data stream; and, select, based on the comparison, first and second portions in the second compressed data stream, matched with the common and unique portions, respectively, in the sequence, wherein:

the first portion has respective compressed frame data equal to the respective compressed frame data for the common portion; and, the second portion has respective compressed frame data unequal to the respective compressed frame data for the common portion.

2. The computer-based method of claim 1, wherein:

each respective compressed frame data includes respective compressed video data and respective compressed audio data;

for respective pairs of frames in the common and first portions, matched according to the sequence, sizes for respective compressed frame data are substantially equal; and, for respective pairs of frames in the unique and second portions, matched according to the sequence, sizes for respective compressed frame data are substantially unequal.

3. The computer-based method of claim 1, wherein:

the first and second compressed data streams include first and second pluralities of segments, respectively, including the first and second pluralities of frames, respectively;

each segment in the first and second pluralities of segments includes a respective intra-frame, in a starting position according to the sequence in said each segment; and, the respective intra-frame includes all data necessary to replicate images and audio for a scene associated with the respective intra-frame, the method further comprising using the at least one specially programmed computer to:

select first and second intra-frames from the first and second data streams, respectively, matched according to the sequence and having equal respective compressed frame data;

identify an initial occurrence of a pair of frames from the first and second data streams following the first and second intra-frames, matched according to the sequence, and having unequal respective compressed frame data; and, identify a first frame, in the first data stream, immediately preceding the pair of frames in the sequence, as a start validation frame for the unique portion, wherein the start validation frame is a third intra-frame or the start validation frame is not a third intra-frame.

4. The computer-based method of claim 3, further comprising, when the start validation frame is not the third intra-frame, using the at least one specially programmed computer to:

access an unrendered data stream for the first compressed data stream;

select a portion of the unrendered data stream matched with the start validation frame in the sequence;

render and compress the portion such that the portion is the third intra-frame; and, replace the start validation frame with the third intra-frame.

5. The computer-based method of claim 4, wherein the start validation frame occurs at a first time in the sequence, the method further comprising using the at least one specially programmed computer to:

access a first unrendered data stream;

select a first portion, in the first unrendered data stream, matched with the start validation frame in the sequence;

render and compress the first portion such that the first portion is a fourth intra-frame;

compare the respective compressed frame data for the start validation frame and the fourth intra-frame; and when the respective compressed frame data for the start validation frame and the fourth intra-frame are equal, compare respective pairs of bits, matched according to the sequence, in respective bit streams for the end validation frame and the fourth intra-frame; or, when the respective compressed frame data for the start validation frame and the fourth intra-frame are unequal:

select a fifth intra-frame, from the first compressed data stream, preceding the start validation frame in the sequence as an adjusted start validation frame;

select a second portion, in the unrendered data stream, matched with the adjusted start validation frame in the sequence;

render and compress the second portion as a sixth intra-frame; and, compare the respective compressed frame data for the adjusted start validation frame and the sixth intra-frame.

6. The computer-based method of claim 5, wherein:

comparing respective pairs of bits includes determining that all respective pairs of bits are equal, the method further comprising using the at least one specially programmed computer to:

render and compress a second portion of the unrendered data stream immediately following the first portion in the sequence; and, insert the second portion into the first compressed data stream such that the second portion immediately follows the start validation frame; or, comparing respective pairs of bits includes determining that one respective pair of bits is unequal, the method further comprising using the at least one specially programmed computer to:

select a fifth intra-frame, from the first compressed data stream, preceding the start validation frame in the sequence as an adjusted start validation frame;

select a second portion, in the unrendered data stream, matched with the adjusted start validation frame in the sequence;

render and compress the second portion as a sixth intra-frame; and, compare the respective compressed frame data for the adjusted start validation frame and the fifth intra-frame.

7. The computer-based method of claim 3, further comprising, using the at least one specially programmed computer to:

identify an initial occurrence of fourth and fifth intra-frames from the first and second compressed data streams, respectively: following the start validation frame in the sequence; matched according to the sequence; and having equal respective compressed frame data;

compare respective compressed frame data for first and second segments, preceding the fourth and fifth intra-frames, respectively, in the sequence, to select first and second candidate frames from the first and second compressed data streams, respectively, the first and second candidate frames: having respective compressed frame data different by more than a threshold from remaining frames in the first and second segments, respectively; and matched in position according to the sequence;

access an unrendered data stream used to generate the first compressed data stream;

select first and second portions, in the first unrendered data stream, matched with the first and second candidate frames, respectively, in the sequence;

render and compress the first and second portions such that the first and second portions are sixth and seventh intra-frames; and, determine that all respective pairs of bits, matched according to the sequence, in first and second bit streams for the sixth and seventh intra-frames, respectively, are equal, and select the sixth intra-frame as an end validation frame; or, determine that at least one respective pair of bits, matched according to the sequence, in first and second bit streams for the sixth and seventh intra-frames, respectively, is unequal, select the fourth intra-frame as an end validation frame.

8. The computer-based method of claim 7, wherein the end validation frame occurs at a first time in the sequence, the method further comprising using the at least one specially programmed computer to:

access a first unrendered data stream;

select a first portion, in the first unrendered data stream, matched with the end validation frame in the sequence;

render and compress the first portion such that the first portion is an eighth intra-frame;

compare the respective compressed frame data for the end validation frame and the eighth intra-frame; and when the respective compressed frame data for the end validation frame and the eighth intra-frame are equal, compare respective pairs of bits, matched according to the sequence, in respective bit streams for the end validation frame and the eighth intra-frame; or, when the respective compressed frame data for the end validation frame and the eighth intra-frame are unequal:

select a ninth intra-frame, from the first compressed data stream, following the end validation frame in the sequence as an adjusted end validation frame;

select a second portion, in the unrendered data stream, matched with the adjusted end validation frame in the sequence;

render and compress the second portion as a tenth intra-frame; and, compare the respective compressed frame data for the adjusted end validation frame and the tenth intra-frame.

9. The computer-based method of claim 8, wherein:

comparing respective pairs of bits includes determining that all respective pairs of bits are equal, the method further comprising using the at least one specially programmed computer to:

render and compress a second portion of the unrendered data stream immediately preceding the first portion in the sequence; and, insert the second portion into the first compressed data stream such that the second portion immediately precedes the end validation frame; or, comparing respective pairs of bits includes determining that one respective pairs of bits is unequal, the method further comprising using the at least one specially programmed computer to:

select a ninth intra-frame, from the first compressed data stream, following the end validation frame in the sequence as an adjusted end validation frame;

select a second portion, in the unrendered data stream, matched with the adjusted end validation frame in the sequence;

render and compress the second portion as a tenth intra-frame; and, compare the respective compressed frame data for the adjusted end validation frame and the tenth intra-frame.

10. The computer-based method of claim 3, further comprising, using the at least one specially programmed computer to:

identify an initial occurrence of fourth and fifth intra-frames from the first and second compressed data streams: following the start validation frame in the sequence; matched according to the sequence; and having equal respective compressed frame data;

determine that no pair of frames from the first and second compressed data streams, respectively, located in first and second segments preceding the fourth and fifth intra-frames, respectively, in the sequence, and matched in position according to the sequence, have respective compressed frame data more different than a threshold from remaining frames in the first and second segment, respectively; and, select the fourth intra-frame as an end validation frame.

11. The computer-based method of claim 3, further comprising, using the at least one specially programmed computer to:

identify an initial occurrence of fourth and fifth intra-frames from the first and second compressed data streams, respectively: following the start validation frame in the sequence; matched according to the sequence; and having equal respective compressed frame data;

compare respective compressed frame data for first and second segments, preceding the fourth and fifth intra-frames, respectively, in the sequence, to select first and second candidate frames from the first and second compressed data streams, respectively, the first and second candidate frames: having respective compressed frame data different by more than a threshold from remaining frames in the first and second segments, respectively; and matched in position according to the sequence;

at least partially decompress respective compressed frame data for the first and second candidate frames;

compare respective at least partially decompressed data for the first and second candidate frames; and, when the respective at least partially decompressed data are no more different than a second threshold access an unrendered data stream used to generate the first compressed data stream;

select a first portion, in the first unrendered data stream, matched with the first candidate frame;

render and compress the first portion such that the first portion is a sixth intra-frame; and, replace the first candidate frame with the sixth intra-frame and identify the first candidate frame as an end validation frame; or when the respective at least partially decompressed data are more different than a second threshold, select the fourth intra-frame as an end validation frame.

12. The computer-based method of claim 11, wherein the end validation frame occurs at a first time in the sequence, the method further comprising using the at least one specially programmed computer to:

render the end validation frame such that the end validation frame includes first rendered frame data;

access a first unrendered data stream;

select a first portion, in the first unrendered data stream, matched with the end validation frame in the sequence;

render the first portion such that the first portion includes second rendered frame data;

compare the first and second rendered data; and when the first and second rendered data are no more different than a third threshold:

render and compress a second portion of the unrendered data stream immediately preceding the first portion in the sequence; and, insert the second portion into the first compressed data stream such that the second portion immediately precedes the end validation frame; or, when the first and second rendered data are more different than a third threshold:

select an eighth intra-frame, from the first compressed data stream, following the end validation frame in the sequence as an adjusted end validation frame;

select a second portion, in the unrendered data stream, matched with the adjusted end validation frame in the sequence;

render the eighth intra-frame and the second portion to include respective rendered frame data; and, compare a difference between the respective rendered frame data to the third threshold.

13. A computer-based method for generating a video, comprising using at least one specially programmed computer to:

access a compressed data stream, for a first video, the compressed data stream including:

a first plurality of frames arranged in a sequence, each frame in the first plurality of frames including respective compressed frame data; and, in the first plurality of frames: a start validation intra-frame, and an end validation intra-frame following the start validation intra-frame in the sequence;

access an unrendered data stream;

identify first and second portions in the unrendered data stream matched with the start validation frame and the end validation frame, respectively, in the sequence;

render and compress the first and second portions such that the first and second portions are first and second intra-frames, respectively;

compare respective compressed frame data for the start validation intra-frame and the first intra-frame, respectively; and, when respective compressed frame data for the start validation intra-frame and the first intra-frame are equal, compare respective pairs of bits, matched according to the sequence, in respective bit streams for the start validation frame and the first intra-frame; or, when respective compressed frame data for the start validation intra-frame and the first intra-frame are unequal:

select a third intra-frame, from the first compressed data stream, preceding the start validation frame in the sequence as an adjusted start validation frame;

select a third portion, in the unrendered data stream, matched with the adjusted start validation frame in the sequence;

render and compress the third portion as a fourth intra-frame; and, compare the respective compressed frame data for the adjusted start validation frame and the fourth intra-frame; and, compare respective compressed frame data for the end validation intra-frame and the second intra-frame, respectively; and, when respective compressed frame data for the end validation intra-frame and the second intra-frame are equal, compare respective pairs of bits, matched according to the sequence, in respective bit streams for the end validation frame and the second intra-frame; or, when respective compressed frame data for the end validation intra-frame and the second intra-frame are unequal:

select a third intra-frame, from the first compressed data stream, following the end validation frame in the sequence as an adjusted end validation frame;

select a third portion, in the unrendered data stream, matched with the adjusted end validation frame in the sequence;

render and compress the third portion as a fourth intra-frame; and, compare the respective compressed frame data for the adjusted end validation frame and the fourth intra-frame.

14. The computer-based method of claim 13, wherein:

comparing respective pairs of bits for the start validation intra-frame and the first intra-frame includes determining that all respective pairs of bits are equal, the method further comprising using the at least one specially programmed computer to:

render and compress a third portion of the unrendered data stream immediately following the first portion in the sequence; and, insert the third portion into the first compressed data stream such that the third portion immediately follows the start validation frame; or, comparing respective pairs of bits for the start validation intra-frame and the first intra-frame includes determining that one respective pairs of bits is unequal, the method further comprising using the at least one specially programmed computer to:

select a third intra-frame, from the first compressed data stream, following the start validation frame in the sequence as an adjusted start validation frame;

select a third portion, in the unrendered data stream, matched with the adjusted start validation frame in the sequence;

render and compress the third portion as a fourth intra-frame; and, compare the respective compressed frame data for the adjusted start validation frame and the fourth intra-frame.

15. The computer-based method of claim 13, wherein:

comparing respective pairs of bits for the end validation intra-frame and the second intra-frame includes determining that all respective pairs of bits are equal, the method further comprising using the at least one specially programmed computer to:

render and compress a third portion of the unrendered data stream immediately preceding the second portion in the sequence; and, insert the third portion into the first compressed data stream such that the third portion immediately precedes the end validation frame; or, comparing respective pairs of bits for the end validation intra-frame and the second intra-frame includes determining that one respective pairs of bits is unequal, the method further comprising using the at least one specially programmed computer to:

select a third intra-frame, from the first compressed data stream, following the end validation frame in the sequence as an adjusted end validation frame;

select a third portion, in the unrendered data stream, matched with the adjusted end validation frame in the sequence;

render and compress the third portion as a fourth intra-frame; and, compare the respective compressed frame data for the adjusted end validation frame and the fourth intra-frame.

16. A computer-based system for generating a compressed template data stream, comprising:

a memory element for at least one specially programmed computer arranged to store computer executable instructions; and, at least one processor for the at least one specially programmed computer arranged to execute the computer executable instructions to:

access a first compressed data stream for a first movie, the first compressed data stream including a first plurality of frames arranged in a sequence, each frame in the first plurality including respective compressed frame data;

access a second compressed data stream for a second movie, the second compressed data stream including a second plurality of frames arranged in a sequence, each frame in the second plurality including respective compressed frame data;

compare respective compressed frame data for respective pairs of frames in the first and second pluralities of frames, matched according to the sequence;

select, based on the comparison, a common portion and a unique portion in the first compressed data stream; and, select, based on the comparison, first and second portions in the second compressed data stream, matched with the common and unique portions, respectively, in the sequence, wherein:

the first portion has respective compressed frame data equal to the respective compressed frame data for the common portion; and, the second portion has respective compressed frame data unequal to the respective compressed frame data for the common portion.

17. The computer-based system of claim 16, wherein:

each respective compressed frame data includes respective compressed video data and respective compressed audio data;

for respective pairs of frames in the common and first portions, matched according to the sequence, sizes for respective compressed frame data are substantially equal; and, for respective pairs of frames in the unique and second portions, matched according to the sequence, sizes for respective compressed frame data are substantially unequal.

18. The computer-based system of claim 17, wherein:

the first and second compressed data streams include first and second pluralities of segments, respectively, including the first and second pluralities of frames, respectively;

each segment in the first and second pluralities of segments includes a respective intra-frame, in a starting position according to the sequence in said each segment;

the respective intra-frame includes all data necessary to replicate images and audio for a scene associated with the respective intra-frame; and, the at least one processor is arranged to:

select first and second intra-frames from the first and second data streams, respectively, matched according to the sequence and having equal respective compressed frame data;

identify an initial occurrence of a pair of frames from the first and second data streams following the first and second intra-frames, matched according to the sequence, and having unequal respective compressed frame data; and, identify a first frame, in the first data stream, immediately preceding the pair of frames in the sequence, as a start validation frame for the unique portion, wherein the start validation frame is a third intra-frame or the start validation frame is not an intra-frame.

19. The computer-based system of claim 18, wherein the at least one processor is arranged to:

access an unrendered data stream used to generate the first compressed data stream;

select a portion of the unrendered data stream matched with the start validation frame in the sequence;

render and compress the portion such that the portion is the third intra-frame; and, replace the start validation frame with the third intra-frame.

20. The computer-based system of claim 19, wherein:

the start validation frame occurs at a first time in the sequence; and, the at least one processor is arranged to:

access a first unrendered data stream;

select a first portion, in the first unrendered data stream, matched with the start validation frame in the sequence;

render and compress the first portion such that the first portion is a fourth intra-frame;

compare the respective compressed frame data for the start validation frame and the fourth intra-frame; and when the respective compressed frame data for the start validation frame and the fourth intra-frame are equal, compare respective pairs of bits, matched according to the sequence, in respective bit streams for the end validation frame and the eighth intra-frame; or, when the respective compressed frame data for the start validation frame and the fourth intra-frame are unequal:

select a fifth intra-frame, from the first compressed data stream, preceding the start validation frame in the sequence as an adjusted start validation frame;

select a second portion, in the unrendered data stream, matched with the adjusted start validation frame in the sequence;

render and compress the second portion as a sixth intra-frame; and, compare the respective compressed frame data for the adjusted start validation frame and the sixth intra-frame.

21. The computer-based system of claim 20, wherein:

comparing respective pairs of bits includes determining that all respective pairs of bits are equal; and, the at least one processor is arranged to render and compress a second portion of the unrendered data stream immediately following the first portion in the sequence; and, insert the second portion into the first compressed data stream such that the second portion immediately follows the start validation frame; or, comparing respective pairs of bits includes determining that one respective pairs of bits is unequal; and, the at least one processor is arranged to:

select a fifth intra-frame, from the first compressed data stream, preceding the start validation frame in the sequence as an adjusted start validation frame;

select a second portion, in the unrendered data stream, matched with the adjusted start validation frame in the sequence;

render and compress the second portion as a sixth intra-frame; and, compare the respective compressed frame data for the adjusted start validation frame and the fifth intra-frame.

22. The computer-based system of claim 18, wherein the at least one processor is arranged to:

identify an initial occurrence of fourth and fifth intra-frames from the first and second compressed data streams, respectively: following the start validation frame in the sequence; matched according to the sequence; and having equal respective compressed frame data;

compare respective compressed frame data for first and second segments, preceding the fourth and fifth intra-frames, respectively, in the sequence, to select first and second candidate frames from the first and second compressed data streams, respectively, the first and second candidate frames: having respective compressed frame data different by more than a threshold from remaining frames in the first and second segments, respectively; and matched in position according to the sequence;

access an unrendered data stream used to generate the first compressed data stream;

select first and second portions, in the first unrendered data stream, matched with the first and second candidate frames, respectively, in the sequence;

render and compress the first and second portions such that the first and second portions are sixth and seventh intra-frames; and, determine that all respective pairs of bits, matched according to the sequence, in first and second bit streams for the sixth and seventh intra-frames, respectively, are equal, and select the sixth intra-frame as an end validation frame; or, determine that at least one respective pair of bits, matched according to the sequence, in first and second bit streams for the sixth and seventh intra-frames, respectively, is unequal, select the fourth intra-frame as an end validation frame.

23. The computer-based system of claim 22, wherein:

the end validation frame occurs at a first time in the sequence; and, the at least one processor is arranged to:

access a first unrendered data stream;

select a first portion, in the first unrendered data stream, matched with the end validation frame in the sequence;

render and compress the first portion such that the first portion is an eighth intra-frame;

compare the respective compressed frame data for the end validation frame and the eighth infra-frame; and when the respective compressed frame data for the end validation frame and the eighth intra-frame are equal, compare respective pairs of bits, matched according to the sequence, in respective bit streams for the end validation frame and the eighth intra-frame; or, when the respective compressed frame data for the end validation frame and the eighth intra-frame are unequal:

select a ninth intra-frame, from the first compressed data stream, following the end validation frame in the sequence as an adjusted end validation frame;

select a second portion, in the unrendered data stream, matched with the adjusted end validation frame in the sequence; and, compare the respective compressed frame data for the adjusted end validation frame and the ninth intra-frame.

24. The computer-based system of claim 18, wherein:

comparing respective pairs of bits includes determining that all respective pairs of bits are equal; and, the at least one processor is arranged to:

render and compress a second portion of the unrendered data stream immediately preceding the first portion in the sequence; and, insert the second portion into the first compressed data stream such that the second portion immediately precedes the end validation frame; or, comparing respective pairs of bits includes determining that one respective pairs of bits is unequal; and, the at least one processor is arranged to:

select a ninth intra-frame, from the first compressed data stream, following the end validation frame in the sequence as an adjusted end validation frame;

select a second portion, in the unrendered data stream, matched with the adjusted end validation frame in the sequence; and, compare the respective compressed frame data for the adjusted end validation frame and the ninth intra-frame.

25. The computer-based system of claim 18, wherein the at least one specially programmed computer is arranged to:

identify an initial occurrence of fourth and fifth intra-frames from the first and second compressed data streams: following the start validation frame in the sequence; matched according to the sequence; and having equal respective compressed frame data;

determine that no pair of frames from the first and second compressed data streams, respectively, located in first and second segments preceding the fourth and fifth intra-frames, respectively, in the sequence, and matched in position according to the sequence, have respective compressed frame data more different than a threshold from remaining frames in the first and second segment, respectively; and, select the fourth intra-frame as an end validation frame.

26. The computer-based system of claim 14, wherein the at least one processor is arranged to:

identify an initial occurrence of fourth and fifth intra-frames from the first and second compressed data streams, respectively: following the start validation frame in the sequence; matched according to the sequence; and having equal respective compressed frame data;

compare respective compressed frame data for first and second segments, preceding the fourth and fifth intra-frames, respectively, in the sequence, to select first and second candidate frames from the first and second compressed data streams, respectively, the first and second candidate frames: having respective compressed frame data different by more than a threshold from remaining frames in the first and second segments, respectively; and matched in position according to the sequence;

at least partially decompress respective compressed frame data for the first and second candidate frames;

compare respective at least partially decompressed data for the first and second candidate frames; and, when the respective at least partially decompressed data are no more different than a second threshold access an unrendered data stream used to generate the first compressed data stream;

select a first portion, in the first unrendered data stream, matched with the first candidate frame;

render and compress the first portion such that the first portion is a sixth intra-frame; and, replace the first candidate frame with the sixth intra-frame and identify the first candidate frame as an end validation frame; or when the respective at least partially decompressed data are more different than a second threshold, select the fourth intra-frame as an end validation frame.

27. The computer-based method of claim 26, wherein:

the end validation frame occurs at a first time in the sequence; and, the at least one processor is arranged to:

render the end validation frame such that the end validation frame includes first rendered frame data;

access a first unrendered data stream;

select a first portion, in the first unrendered data stream, matched with the end validation frame in the sequence;

render the first portion such that the first portion includes second rendered frame data;

compare the first and second rendered data; and when the first and second rendered data are no more different than a third threshold:

render and compress a second portion of the unrendered data stream immediately preceding the first portion in the sequence; and, insert the second portion into the first compressed data stream such that the second portion immediately precedes the end validation frame; or, when the first and second rendered data are more different than a third threshold:

select an eighth intra-frame, from the first compressed data stream, following the end validation frame in the sequence as an adjusted end validation frame;

select a second portion, in the unrendered data stream, matched with the adjusted end validation frame in the sequence;

render the eighth intra-frame and the second portion to include respective rendered frame data; and, compare a difference between the respective rendered frame data to a third threshold.

28. A computer-based system for generating a video, comprising:

a memory element for at least one specially programmed computer arranged to store computer executable instructions; and, at least one processor for the at least one specially programmed computer arranged to execute the computer executable instructions to:

access a compressed data stream, for a first video, the compressed data stream including:

a first plurality of frames arranged in a sequence, each frame in the first plurality of frames including respective compressed frame data; and, in the first plurality of frames: a start validation intra-frame, and an end validation intra-frame following the start validation intra-frame in the sequence;

access an unrendered data stream;

identify first and second portions in the unrendered data stream matched with the start validation frame and the end validation frame, respectively, in the sequence;

render and compress the first and second portions such that the first and second portions are first and second intra-frames, respectively;

compare respective compressed frame data for the start validation intra-frame and the first intra-frame, respectively; and, when respective compressed frame data for the start validation intra-frame and the first intra-frame are equal, compare respective pairs of bits, matched according to the sequence, in respective bit streams for the start validation frame and the first intra-frame; or, when respective compressed frame data for the start validation intra-frame and the first intra-frame are unequal:

select a third intra-frame, from the first compressed data stream, preceding the start validation frame in the sequence as an adjusted start validation frame;

select a third portion, in the unrendered data stream, matched with the adjusted start validation frame in the sequence;

render and compress the third portion as a fourth intra-frame; and, compare the respective compressed frame data for the adjusted start validation frame and the fourth intra-frame; and, compare respective compressed frame data for the end validation intra-frame and the second intra-frame, respectively; and, when respective compressed frame data for the end validation intra-frame and the second intra-frame are equal, compare respective pairs of bits, matched according to the sequence, in respective bit streams for the end validation frame and the second intra-frame; or, when respective compressed frame data for the end validation intra-frame and the second intra-frame are unequal:

select a third intra-frame, from the first compressed data stream, following the end validation frame in the sequence as an adjusted end validation frame;

select a third portion, in the unrendered data stream, matched with the adjusted end validation frame in the sequence;

render and compress the third portion as a fourth intra-frame; and, compare the respective compressed frame data for the adjusted end validation frame and the fourth intra-frame.

29. The computer-based system of claim 28, wherein:

comparing respective pairs of bits for the start validation intra-frame and the first intra-frame includes determining that all respective pairs of bits are equal; and, the at least one processor is arranged to:

render and compress a third portion of the unrendered data stream immediately following the first portion in the sequence; and, insert the third portion into the first compressed data stream such that the third portion immediately follows the start validation frame; or, comparing respective pairs of bits for the start validation intra-frame and the first intra-frame includes determining that one respective pairs of bits is unequal; and, the at least one processor is arranged to:

select a third intra-frame, from the first compressed data stream, following the start validation frame in the sequence as an adjusted start validation frame;

select a third portion, in the unrendered data stream, matched with the adjusted start validation frame in the sequence;

render and compress the third portion as a fourth intra-frame; and, compare the respective compressed frame data for the adjusted start validation frame and the fourth intra-frame.

30. The computer-based system of claim 28, wherein:

comparing respective pairs of bits for the end validation intra-frame and the second intra-frame includes determining that all respective pairs of bits are equal; and, the at least one processor is arranged to:

render and compress a third portion of the unrendered data stream immediately preceding the second portion in the sequence; and, insert the third portion into the first compressed data stream such that the third portion immediately precedes the end validation frame; or, comparing respective pairs of bits for the end validation intra-frame and the second intra-frame includes determining that one respective pairs of bits is unequal; and, the at least one processor is arranged to:

select a third intra-frame, from the first compressed data stream, following the end validation frame in the sequence as an adjusted end validation frame;

select a third portion, in the unrendered data stream, matched with the adjusted end validation frame in the sequence;

render and compress the third portion as a fourth intra-frame; and, compare the respective compressed frame data for the adjusted end validation frame and the fourth intra-frame.

31. A computer-based method for generating a video, comprising using at least one specially programmed computer to:

access a compressed data stream, for a first video, the compressed data stream including:

a first plurality of frames arranged in a sequence, each frame in the first plurality of frames including respective compressed frame data; and, in the first plurality of frames: a start validation intra-frame, and an end validation intra-frame following the start validation intra-frame in the sequence;

render the start and end validation frames such that the start and validation frames include first and second rendered frame data, respectively;

access an unrendered data stream;

identify first and second portions in the unrendered data stream matched with the start validation frame and the end validation frame, respectively, in the sequence;

render the first and second portions such that the first and second portions include third and fourth rendered frame data, respectively;

compare the first and third rendered frame data; and, when the first and third rendered data are no more different than a threshold:

render and compress a third portion of the unrendered data stream immediately following the first portion in the sequence; and, insert the third portion into the first compressed data stream such that the third portion immediately follows the start validation frame; or, when the first and third rendered data are more different than a threshold:

select an intra-frame, from the first compressed data stream, preceding the validation frame in the sequence as an adjusted start validation frame;

select a third portion, in the unrendered data stream, matched with the adjusted start validation frame in the sequence;

render the intra-frame and the third portion to include respective rendered frame data; and, compare a difference between the respective rendered frame data to the threshold;

compare the second and fourth rendered frame data; and, when the second and fourth rendered data are no more different than a threshold:

render and compress a third portion of the unrendered data stream immediately preceding the second portion in the sequence; and, insert the third portion into the first compressed data stream such that the third portion immediately precedes the end validation frame; or, when the second and fourth rendered data are more different than a threshold:

select an intra-frame, from the first compressed data stream, following the validation frame in the sequence as an adjusted end validation frame;

select a third portion, in the unrendered data stream, matched with the adjusted end validation frame in the sequence;

render the intra-frame and the third portion to include respective rendered frame data; and, compare a difference between the respective rendered frame data to the threshold.

32. A computer-based system for generating a compressed template data stream, comprising:

a memory element for at least one, specially programmed computer arranged to store computer executable instructions; and, at least one processor for the at least one specially programmed computer arranged to execute the computer executable instructions to:

access a compressed data stream, for a first video, the compressed data stream including:

a first plurality of frames arranged in a sequence, each frame in the first plurality of frames including respective compressed frame data; and, in the first plurality of frames: a start validation intra-frame, and an end validation intra-frame following the start validation intra-frame in the sequence;

render the start and end validation frames such that the start and validation frames include first and second rendered frame data, respectively;

access an unrendered data stream;

identify first and second portions in the unrendered data stream matched with the start validation frame and the end validation frame, respectively, in the sequence;

render the first and second portions such that the first and second portions include third and fourth rendered frame data, respectively;

compare the first and third rendered frame data; and, when the first and third rendered data are no more different than a threshold:

render and compress a third portion of the unrendered data stream immediately following the first portion in the sequence; and, insert the third portion into the first compressed data stream such that the third portion immediately follows the start validation frame; or, when the first and third rendered data are more different than a threshold:

select an intra-frame, from the first compressed data stream, preceding the validation frame in the sequence as an adjusted start validation frame;

select a third portion, in the unrendered data stream, matched with the adjusted start validation frame in the sequence;

render the intra-frame and the third portion to include respective rendered frame data; and, compare a difference between the respective rendered frame data to the threshold;

compare the second and fourth rendered frame data; and, when the second and fourth rendered data are no more different than a threshold:

render and compress a third portion of the unrendered data stream immediately preceding the second portion in the sequence; and, insert the third portion into the first compressed data stream such that the third portion immediately precedes the end validation frame; or, when the second and fourth rendered data are more different than a threshold:

select an intra-frame, from the first compressed data stream, following the validation frame in the sequence as an adjusted end validation frame;

select a third portion, in the unrendered data stream, matched with the adjusted end validation frame in the sequence;

render the intra-frame and the third portion to include respective rendered frame data; and, compare a difference between the respective rendered frame data to the threshold.

* * * * *